Patented Oct. 26, 1943

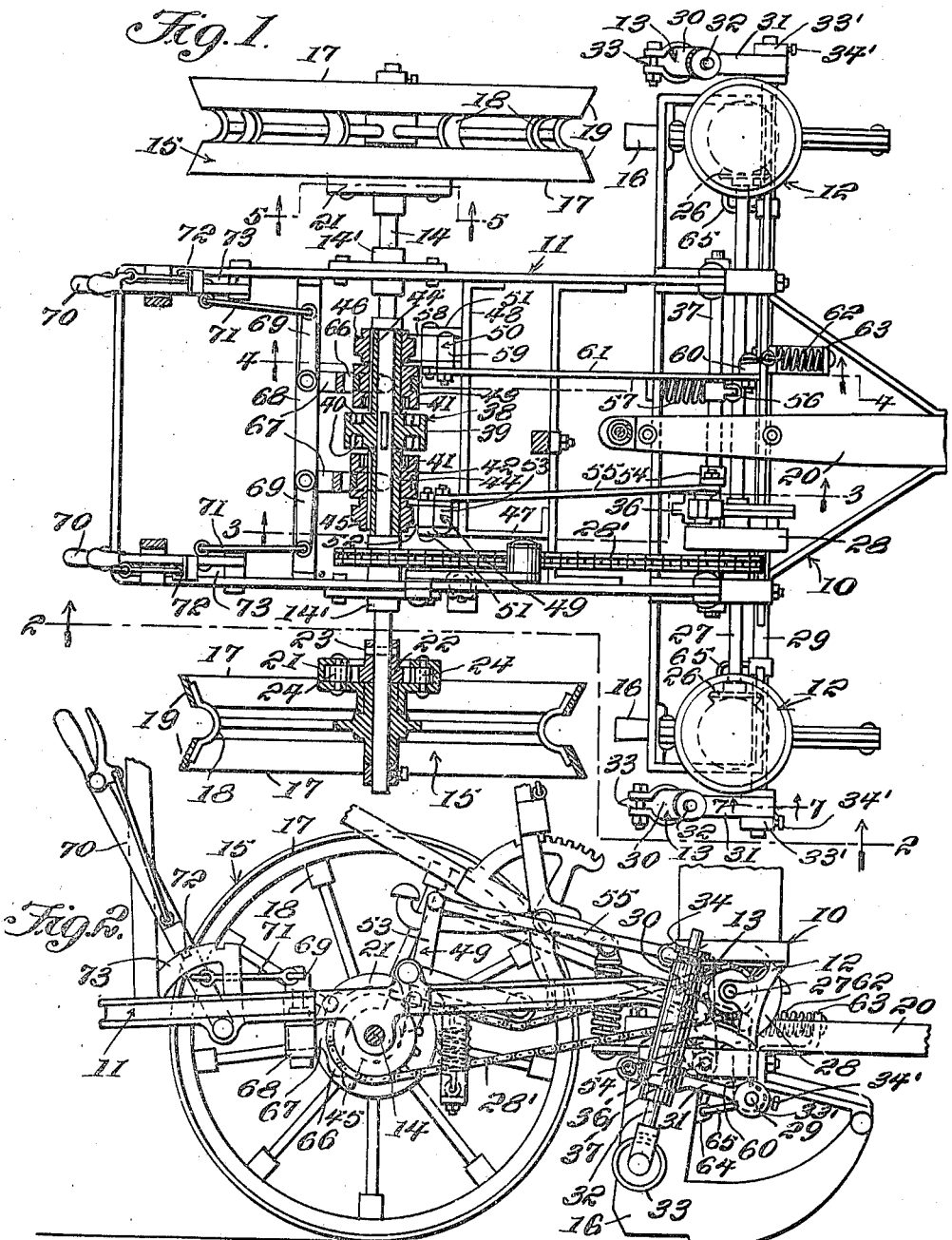

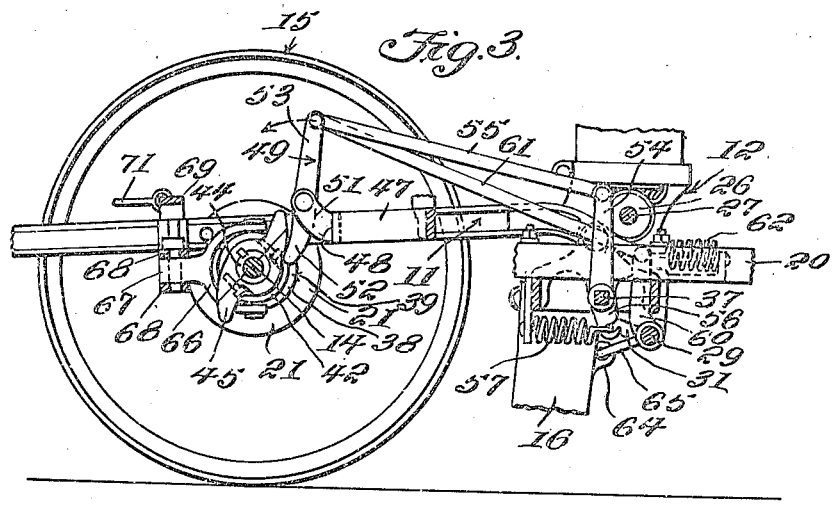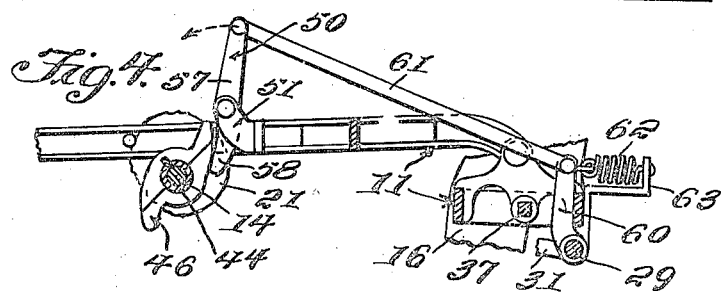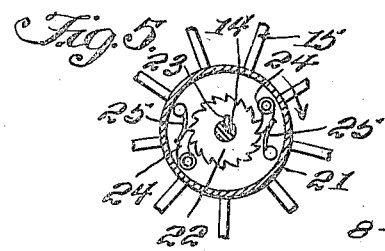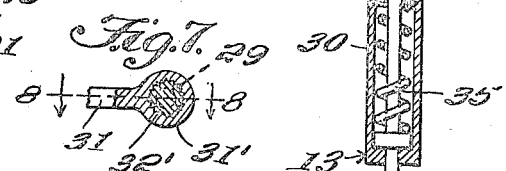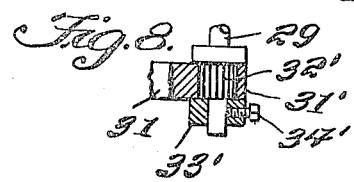

2,332,601

UNITED STATES PATENT OFFICE 2,332,601

CHECKROW ATTACHMENT FOR CORN PLANTERS

Henry Reuter, Brainerd, Minn.

Application April 21, 1941, Serial No. 389,662

4 Claims. (Cl. 111—16)

My invention relates to new and useful improvements in check row attachments for corn planters.

An important object of my invention is the provision of a check row attachment for corn planters that may be easily applied to a planter of conventional construction and operation and which will, when thus applied, eliminate the necessity for using the conventional check wire.

It is a well known fact that the corn planters which are operated by a check wire are unsatisfactory for many reasons including the fact that considerable difficulty is caused by breakage of the wire and the time and expense involved in replacing the same. Another object of my invention, therefore, is the provision of a check row attachment of the above-mentioned character which is durable in its construction, which will operate satisfactorily for the life span of the planting machine and which will be efficient and efficacious in the performance of its duties.

Still another object of my invention is the provision of an attachment of the above-mentioned character which, by a single operation, may be rendered operable to permit the corn to be either check planted or drilled, as desired.

Other objects and advantages of my invention, will be apparent during the course of the following description.

In the drawings, forming a part of this specification, and wherein like numerals are employed to designate like parts throughout the same, Figure 1 is a top plan view of a conventional corn planter and illustrating my attachment incorporated therewith.

Figure 2 is a longitudinal sectional view taken on the line 2—2 of Figure 1,

Figure 3 is a fragmentary longitudinal sectional view taken on the line 3—3 of Figure 1, Figure 4 is a fragmentary longitudinal sectional view taken on the line 4—4 of Figure 1, Figure 5 is a fragmentary vertical sectional view taken on the line 5—5 of Figure 1, illustrating the ratchet drive of the traction wheels, Figure 6 is a longitudinal sectional view, showing parts in elevation, of the marking device comprising a part of the planter, Figure 7 is a fragmentary transverse sectional view taken on the line 7—7 of Figure 1, and Figure 8 is a view, showing parts in section and parts in elevation, taken on the line 8—8 of Figure 7.

In the accompanying drawings, wherein for the purpose of illustration, is shown a preferred embodiment of my invention, the numeral 10 designates a conventional corn planter in its entirety. The planter includes a framework 11 which supports the forwardly located corn dropping mechanisms 12 and marking devices 13. As best illustrated in Figure 1, the corn dropping mechanisms and the marking devices are arranged in pairs, one of each being disposed at opposite sides of the frame. The frame is supported above the ground by the rearwardly located axle 14, the opposite ends of which extend beyond the frame through the bearings 14' to receive the hub portions of the traction wheels 15. One of the corn dropping mechanisms 12 is disposed directly in front of each of the wheels 15 whereby the boot 16 will deposit the kernels of corn directly in advance of the wheel. As illustrated in Figure 1, each of the wheels is formed with laterally spaced annular rims 17 held in fixed relation with each other by transverse straps 18. The outer surfaces 19 of the rims are outwardly divergent whereby movement of the wheels along the ground will permit the flanges passing at opposite sides of the kernels to spread a layer of earth thereover. A drawbar 20 is mounted at the forward end of the frame, which drawbar extends substantially forwardly thereof and includes provision (not shown) for coupling the same to a tractor, or the like.

As best illustrated in Figure 5, each of the wheels 15 is provided with a drum 21 and the portion of the axle extending through the drum carries a ratchet 22 maintained in fixed association therewith by the key 23, or the like. Dogs 24 are pivoted to the drum at opposite sides of the ratchet and the distal ends thereof are yieldably held in meshed engagement with the teeth of the ratchet by the resilient action of springs 25. This arrangement permits the wheels to drive the axle when the planter is moving forwardly and permits the wheels to rotate independently of the axle when the wheels are reversely rotated, as will be readily understood.

The corn dropping mechanisms 12 are actuated by the beveled gears 26 carried by the opposite ends of the countershaft 27. A clutch housing 28 is loosely carried by the countershaft and is adapted to be fixedly connected thereto to effect rotation thereof by a trip mechanism 36 carried by a trip shaft 37, which clutch operates to effect intermittent rotation of the countershaft.

The marking devices 13 are mounted on a second countershaft 29 journaled on the frame in advance of the countershaft 27. The markers are rotatable with the shaft 29 which is, in turn, driven by my attachment presently to be described in detail. Each of the markers comprises a cylindrical casing 30 normally held in a downwardly and rearwardly inclined position by an arm 31. The shank portion 32 of the marker disk 33 extends axially through the casing and through the plug 34 adjustably screw-threadedly received within the open upper end of the casing. The shank is limited in its downward movement relative to the casing but is permitted to move upwardly therein against the resilient action of a coil spring 35. The end of the marker arm connecting with the shaft 29 is provided with an enlarged head portion 31' having a toothed opening adapted to receive the gear 32' carried by the shaft. The arm 31, which is held in fixed association with the gear by a collar 33' and set screw 34', may be angularly adjusted about the countershaft 29 and may be fixedly secured in any selected position to initially position the marker disk a selected distance above the ground. Movement of the marker disks 33 into engagement with the ground will be effected for each operation of the corn dropping mechanisms 12 and the impact of the disk against the ground will be absorbed by axial movement of the shank 32 against the resilient action of the coil spring 35.

Heretofore, the actuator means for tripping the clutch 28 and operating the corn dropping mechanisms 12 and marking device 13 has comprised a wire which reciprocates to actuate levers carried by the several parts. I propose to eliminate this wire and to replace the same with a mechanical arrangement of more sturdy and desirable construction.

A clutch 38 is carried by the rear axle 14 and includes a central external clutch part 39 fixedly mounted on the axle for rotation therewith. The opposite sides of the clutch part 39 are provided with pockets or recesses 40 for receiving the projections 41 extending from the confronting faces of the slidable internal clutch parts 42 and 43. Each of the internal clutch parts is slidably mounted onto a sleeve 44 carried by the axle. Each of the internal parts is mounted on its respective sleeve in a manner to be independently movable into and out of engagement with the external clutch part 39. The outer end of each of the sleeves projects substantially beyond its respective internal clutch part and the double action cams 45 and 46 are fixedly mounted thereon.

The frame is provided slightly forwardly of the axle with a transverse brace 47 having a portion 48 extending in laterally spaced parallel relation with the axle. Vertically disposed levers 49 and 50 are pivotally mounted on brackets 51 extending from the portion 48 in the direction of the axle, each of the levers being arranged in longitudinal alignment with a respective one of the cams 45. The lever 49 includes a part 52 which extends below the pivot and in the path of the rotating cam 45 whereby the part 53 thereof extending above the pivot will be rocked angularly twice for each rotation of the axle. The upper end of the lever 49 is connected to a rocker arm 54 fixedly mounted on the trip shaft 37 by a pivoted link member 55. Rotation of the trip shaft will thus be effected each time one of the cam face of the cam 45 engages the bottom part of the lever 49. The rocker shaft also includes a depending hook portion 56 which is connected to a portion of the frame 11 by a coil spring 57. The spring extends in the direction of the axle 14 so that movement of the rocker arm in that direction will effect stretching of the spring and whereby release of the lever 49 by the cam will permit the resilient action of the spring to immediately return the rocker arm to a normally upright position.

As previously described, the clutch 28 includes a trip mechanism 36 mounted on the trip shaft 37. Obviously, then, rotation of the trip shaft 37 by the cam 45 will effect movement of the trip mechanism to engage the clutch and to permit the driven clutch part to be connected to the countershaft 27. The above construction and operation is conventional, it being preferred that the clutch and shaft make one complete revolution and then engage the trip mechanism 36 to release the shaft.

The lever 50 includes a part 58 which extends below the pivot and within the path of the cam 46 so that the lever will be twice rocked about its axis for each rotation of the axle 14. The part 59 of the lever extending above the pivot is connected to a rocker arm 60 fixedly secured to and extending vertically from the countershaft 29 by a pivoted link member 61. A coil spring 62 is connected to the rocker arm 60 and extends forwardly thereof to connect with a part 63 of the frame. Thus, as the lever 50 is rocked about its axis by the cam 46 the rocker arm 60 will be moved in accordance therewith to rotate the countershaft 29 against the resilient action of the coil spring 62. As soon as the lower part 58 of the lever is released by the cam, the coil spring 62 will immediately return the rocker arm 60 to the normal upstanding position. As the shaft 29 is caused to rotate, the markers 13 fixedly mounted on the outer end of the shaft will be moved in a vertical plane angularly toward the ground to cause the disks 33 to strike against the ground. The shaft 29 is also connected to the valve 64 of the corn dropping mechanisms 12 by a radially extending link 65. Thus, each actuation of the markers 13 will simultaneously effect actuation of the control valve of the corn dropping mechanism to permit a fresh charge of corn to be dropped from the container and into the boot 16.

Each of the internal clutch parts 42 and 43 is provided with a yoke 66 the bifurcation of which pivotally connects therewith at its upper and lower sides. The shank 67 of each of the yokes is pivotally connected to a part 68 of the frame and includes an integral right angularly extending arm 69 which is connected to a manually actuated lever 70 by a connecting link 71.

In operation, the means connected to the drawbar 20 will pull the planter across a field to be planted. The traction wheels 15 will rotate the axle 14 and the external clutch part 39. As long as the keeper 72 of each of the operating levers 70 is engaged in the rearmost notch of its respective segment 73, the internal clutch parts will be disengaged from the constantly driven intermediate external clutch part 39. Let us assume, however, that the operating levers 70 are each released from the rearmost notch of the segment and advanced to engage the foremost notch thereof. Movement of the levers in this manner will cause the arms 69 of the yokes 66 to rock forwardly in a manner to slide the internal clutch part into engagement with the external clutch part. As is well known to those skilled in the art the housing of the clutch 28 is also rotated by the traction wheels 15 through the medium of an endless chain 28' at a higher rate of speed than the axle. Movement of the internal clutch parts into engagement with the external clutch part will lock their respective sleeves for direct rotation with the axle and consequently the double action cams 45 and 46 arranged into the path of the pivoted levers 49 and 50 will be rotated to effect intermittent rocking of the levers.

As one lug of the cam 45 rocks the lever 49 in the direction of the arrow in Figure 3, the shaft 37 will be rotated to permit the trip mechanism 36 to connect the clutch housing with the countershaft 27. Before the shaft 27 makes a complete revolution the contacted lug of the cam 45 will have disengaged the lever 50 and the resilient spring 57 will have returned the actuated parts to the initial position. Return of the parts to the initial position will again dispose the trip mechanism 36 in contactual relation with the clutch housing whereby as the clutch returns to the initial position it will engage the trip mechanism to release the clutch housing from the countershaft. During the revolution of the shaft 27, however, the beveled gears 26 at the end thereof have agitated the corn dropping mechanisms 12 to deposit a hill of corn.

Simultaneously, with the above operation, the cam 46 will rock the lever 50 and, as the upper end of the lever swings in the direction of the arrow in Figure 4, the countershaft 29 will be rotated sufficiently to impact the marking disks 33 against the ground and to operate the control valve mechanism 64 of the corn dropping mechanisms.

It may thus be seen that the above operations will be effected twice during each revolution of the wheels 15. In order that uniform dropping of the corn may be effected and in order that the same may be dropped at the proper intervals, the wheels 15 should be exactly seven feet in circumference. The double action cam 45 will thus effect agitation of the corn dropping mechanism twice for each revolution of the axle and thus drop the hills of corn exactly three and one-half feet apart.

If the control valve 64 of the corn dropping mechanism is held open and only the internal clutch part 42 connected with the external clutch part 39 the corn may be drilled. This arrangement will obviously effect agitation of the corn dropping mechanism at intervals, however, the constantly open control valve will permit the corn to be dropped from the boot 16 in longitudinal alignment but at irregular intervals.

It is to be understood that the form of my invention, herewith shown and described, is to be taken as a preferred example of the same, and various changes in the size, shape and arrangement of parts may be resorted to without departing from the spirit of my invention, or scope of the appended claims.

Having thus described my invention, I claim:

1. In a corn planting machine having a traction driven axle member, a marking device, and a clutch operated, valve controlled corn dropping mechanism, a wireless check row attachment comprising, a clutch carried by the axle member including an external clutch part rotatable with the axle and internal clutch parts having cam faces loosely mounted on the axle at opposite sides of the external clutch part, means for independently engaging the internal clutch parts with the said external clutch part, actuator means for operating the clutch of the corn dropping mechanism including a pivoted link intermittently contacted by the cam faces of one of the internal cone pieces, and an actuator means for operating the marking devices and the control valve of the corn dropping mechanism including a pivoted link adapted to be intermittently contacted by the cam faces of the other of the internal clutch parts.

2. In a corn planting machine having a frame supporting a traction driven axle member, a marking device, and a clutch operated valve controlled corn dropping mechanism, a wireless check row attachment comprising a clutch mounted on the axle member including an external clutch part rotatable with the axle and internal clutch parts loosely mounted on the axle at opposite sides of the said external clutch part, manual means for independently engaging the internal clutch parts with the external clutch part, a double action cam carried by each of the said internal clutch parts, a pivoted linkage mounted on the frame including a part operatively connected with the clutch of the corn dropping mechanism and a part arranged to be intermittently contacted by the cam of one of the internal clutch parts, and a pivoted linkage mounted on the frame having a part operatively connected with the control valve of the corn dropping mechanism, a part operatively connected with the marking device and a part arranged to be intermittently contacted by the cam carried by the other of the said internal clutch parts.

3. In a corn planting machine having a traction driven axle member, a marking device, and a clutch operated valve controlled corn dropping mechanism, a wireless check row attachment comprising a clutch mounted on the axle including an external clutch part rotatable with the axle and internal clutch parts having cam faces loosely mounted on the axle at opposite sides of the external clutch part, manual means for independently moving the internal clutch parts into and out of engagement with the said external clutch part, a rocker mechanism operatively associated with the marking device and with the control valve of the corn dropping mechanism, a rocker mechanism operatively associated with the clutch of the corn dropping mechanism, vertically disposed lever members pivoted to the frame intermediate their ends and with the portion thereof extending below the pivots arranged to be contacted by the cam surface of the internal clutch parts when the same are engaged with the external clutch part, and link members connecting each of the rocker mechanisms with a respective one of the said levers at a point above its pivot.

4. A corn planting machine, comprising a traction driven axle, traction wheels carried by the axle, a dropping mechanism in advance of each wheel, an oscillating shaft extending beyond the dropping mechanisms, arms carried by the outer ends of the shaft, spring pressed markers carried by the arms, a clutch mechanism for operating the dropping mechanisms, a clutch mounted on the axle including an external clutch part rotatable with the axle, an internal clutch part loosely mounted on the axle at opposite sides of the external clutch part, manual means for independently moving the internal clutch parts into and out of engagement with the external clutch part, a cam carried by each of the internal clutch parts, intermediately pivoted levers having their lower ends engaging the cams, a link pivotally connected to the upper end of one of the intermediately pivoted levers and its opposite end pivotally connected to an arm operating the clutch of the driving mechanism, a link pivoted to the upper end of the other intermediately pivoted lever and connected to an arm carried by the oscillating shaft carrying the markers, whereby the dropping mechanisms and the markers are separately operated and controlled so that either or both may be simultaneously set into operation.

HENRY REUTER.